S. Springstead.

Hoe.

No. 96,739. Patented Nov. 9, 1869.

Witnesses:
C. Wahlers
E. F. Kastenhuber

Inventor:
S. Springstead
by
Van Santvoord & Hauff
Attorneys

United States Patent Office.

SPENCER SPRINGSTEAD, OF WESTCHESTER, NEW YORK.

Letters Patent No. 96,739, dated November 9, 1869.

IMPROVEMENT IN HOES.

The Schedule referred to in these Letters Patent and making part of the same.

*To all whom it may concern:*

Be it known that I, SPENCER SPRINGSTEAD, of Westchester, in the county of Westchester, and State of New York, have invented a new and useful Improvement in Weeding Hoes; and I do hereby declare the following to be a full, clear, and exact description thereof, which will enable those skilled in the art to make and use the same, reference being had to the accompanying drawing, forming part of this specification, in which drawing—

Figure 1:
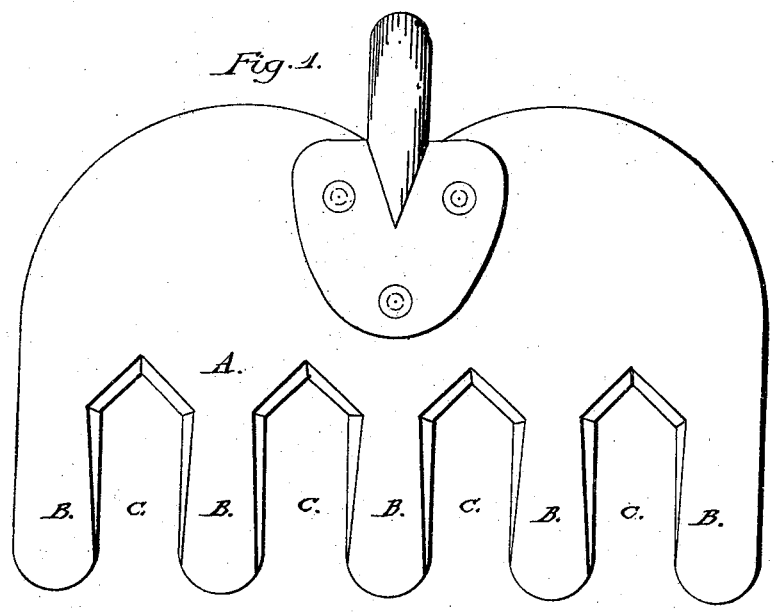
Figure 2:
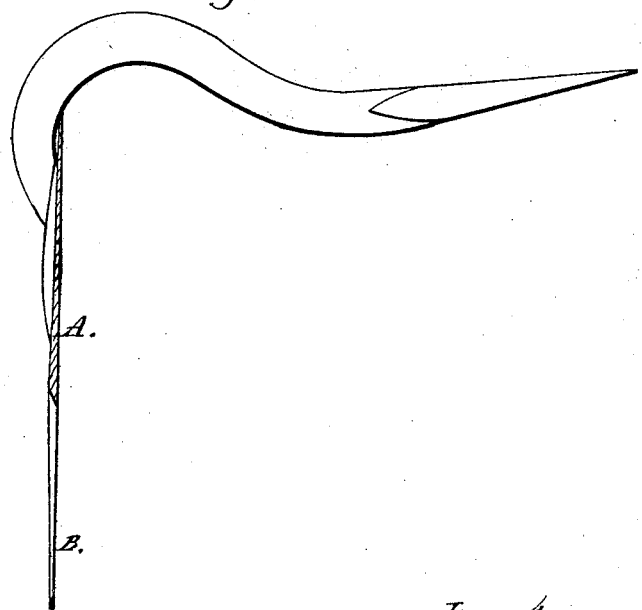

Figure 1 represents a plan of this invention.
Figure 2 is a sectional side elevation of the same.
Similar letters indicate corresponding parts.

This invention relates to a hoe which is provided with parallel teeth, rounded at their ends, and separated from each other by interspaces, with parallel sides and triangular ends, in such a manner that the power required for driving the hoe into the ground is materially reduced, and, by the triangular cutting-edges of the ends of the interspaces, the operation of cutting off the weeds is greatly facilitated, and furthermore, by the peculiar formation of its teeth, my hoe is also applicable as a rake and pulverizer.

In the drawing—

The letter A designates the body of my hoe, which is cut or stamped out of sheet-steel, and from which projects a series of teeth B. These teeth are made with parallel sides and rounded ends, so that they readily enter the ground, and they are separated from each other by interspaces C, with parallel sides and triangular ends, as clearly shown in fig. 1 of the drawing.

The body of the hoe is ground down toward both ends, so as to leave it thickest on a line across the inner ends of the teeth, where the greatest strength is required.

The sides of the teeth and the triangular ends of the interspaces are also ground down so that the same form sharp cutting-edges, and thereby a hoe is produced which combines strength, durability, and great convenience in its use.

Its teeth enter the ground with comparatively little power, and after the ground has thus been disturbed, the weeds are easily cut and removed.

My hoe may also be used as a rake and as a pulverizer.

I am aware that hoes have been constructed with parallel teeth, and therefore lay no claim thereto; but What I do claim, is—

A hoe whose teeth are parallel to each other, with spaces C terminating angularly, the sides of the teeth and the angular terminations being made sharp, as and for the purpose described.

This specification signed by me, this 4th day of September, 1869.

S. SPRINGSTEAD.

Witnesses:
E. F. KASTENHUBER,
JOHN A. WIEDERSHEIM.